(12) United States Patent
Suzuki

(10) Patent No.: US 7,359,736 B2
(45) Date of Patent: Apr. 15, 2008

(54) PORTABLE TELEPHONE SET AND IMAGE DISPLAY METHOD THEREOF

(75) Inventor: Yuzuru Suzuki, Yokohama (JP)

(73) Assignee: NEC Corporation, Tokyo (JP)

( * ) Notice: Subject to any disclaimer, the term of this patent is extended or adjusted under 35 U.S.C. 154(b) by 772 days.

(21) Appl. No.: 10/795,388

(22) Filed: Mar. 9, 2004

(65) Prior Publication Data

US 2004/0180699 A1 Sep. 16, 2004

(30) Foreign Application Priority Data

Mar. 11, 2003 (JP) .............................. 2003-064927

(51) Int. Cl.
*H04B 1/38* (2006.01)
(52) U.S. Cl. .................... 455/566; 455/557; 455/550.1
(58) Field of Classification Search ................ 455/566, 455/566.1, 566.2, 550.1, 557; 348/14.01–14.08, 348/14.09, 14.1, 14.11, 14.12, 14.13
See application file for complete search history.

(56) References Cited

U.S. PATENT DOCUMENTS

| | | | |
|---|---|---|---|
| 6,215,523 B1 | 4/2001 | Anderson | |
| 6,823,198 B2 * | 11/2004 | Kobayashi | ............... 455/556.1 |
| 2001/0020977 A1 | 9/2001 | Watanabe | |
| 2002/0003535 A1 | 1/2002 | Cho | |
| 2002/0180878 A1 | 12/2002 | Iida et al. | |

FOREIGN PATENT DOCUMENTS

| | | | |
|---|---|---|---|
| EP | 1 133 151 A2 | | 9/2001 |
| EP | 1 143 694 A2 | | 10/2001 |
| EP | 1 286 536 A2 | | 2/2003 |
| JP | 404372293 A | * | 12/1992 |
| JP | 2001-272996 | | 10/2001 |
| JP | 2001-309327 | * | 11/2001 |
| JP | 02002281465 A | * | 9/2002 |
| JP | 2002-300241 | | 10/2002 |
| JP | 2002-319998 | | 10/2002 |

* cited by examiner

*Primary Examiner*—Melur Ramakrishnaiah
(74) *Attorney, Agent, or Firm*—Young & Thompson

(57) ABSTRACT

The portable telephone set 10 comprises a user's input processing part 11, a various item processing part 12, a display control part 13, an image converter part 14, a memory unit 15 and an image display part 16 for an LCD or the like. Image data displayed as waiting display or menu display on an image display part 16 is extracted by a user's copying operation, then format converted in an image converter part 14 to a JPEG file or the like and then registered in a memory unit 15. The plurality of pieces of the stored image data are appropriately read out and displayed.

13 Claims, 2 Drawing Sheets

PORTABLE TELEPHONE SET AND IMAGE DISPLAY METHOD THEREOF

BACKGROUND OF THE INVENTION

This application claims benefit of Japanese Patent Application No. 2003-064927 filed on Mar. 11, 2003, the contents of which are incorporated by the reference.

The present invention relates to portable telephone sets and, more particularly, a portable telephone set, which permits the user to produce display images as desired to be displayed on the display screen and store the produced images for selective display at the waiting or like time and an image display method for the same.

With recent progress of communication and semiconductor integration techniques, portable telephone sets (or portable telephone terminals) are in a trend for size and weight reduction, and also with progress of related device techniques in a trend of being more and more improved in performance. Thus, the portable telephone sets are now being rapidly spread. Up to date, the portable telephone sets are used not only as mere voice communication means but also as letter data communication means concerning electronic mails or the like, data retrieval means for executing data retrieval or the like by accessing an internet or like network and image communication means using internal CCD (charged coupled element).

As shown, the portable telephone sets have recently been outstandingly developed and advanced. There is also an increasing demand, with the CCD camera mounted, of image data processing such as imaging with camera. Furthermore, the users are not satisfied with images provided by the manufacturers such as waiting images, menu images and letter input images but demand individual image data peculiar to themselves.

Hitherto, many prior art techniques concerning portable telephone sets have been disclosed. For example, a portable communication terminal has been disclosed, in which a plurality of wall paper images (for instance baseball images, car images and a clock display) are preliminarily stored in a memory part and progressively switched as waiting images whenever the user executes a key operation (see literature 1: Japanese Patent Laid-open No. 2002-300241, for instance). Also, there is disclosed in literature 2: Japanese Patent Laid-open No. 2002-319998, for instance, a portable telephone set, in which an image drawing area and a tool box are prepared in a display part. In this portable telephone set, the user can produce images as desired on the image drawing area by using the tool box and stored them in a RAM (random access memory) and transmit peculiar image data, and an image reading system using the same portable telephone set.

In the prior art technique disclosed in the Literature 1, however, the user is permitted only to select a plurality of images preliminarily prepared and stored in a memory part by the manufacturer and is not permitted to extract and store images as desired by the user. In the prior art techniques disclosed in the Literature 2, image data are produced with the display part in a matrix-shaped image drawing area, and it takes time and difficult for the user to obtain image data as desired.

SUMMARY OF THE INVENTION

The present invention as made in view of the above problems inherent in the prior art, and it has an object of providing a portable telephone set, which permits the user to readily extract, store and register a plurality of images as desired by the user and selectively read out, when it becomes necessary, the registered image data for display thereof on an image display part, and also an image display method for the same.

According to an aspect of the present invention, there is provided a portable telephone set having a user's input processing part such as a keyboard and a display part such as a liquid crystal display unit and operable for radio communication via a base station, comprising a various item processing part for processing execution commands outputted from the user's input processing part, a display control part for delivering display data to be displayed on the display part on the basis of process requests outputted from the various item processing part, an image converter part for obtaining display data on the display part on the basis of a user's copying request and executing image conversion of the obtained data to a predetermined format, and a memory device for storing image data converted in the image converter part.

Image data stored in the memory unit is displayed as waiting display or the like on the display part. The image data is converted in the image converter part to a JPEG file and stored in the memory unit. The image data is obtained by imaging with a camera mounted on the portable telephone set. The image data is selected from images received by radio communication from the base station.

According to another aspect of the present invention, there is provided an image display method for a portable telephone set for displaying image data or the like on a display part of the portable telephone set for transmitting and receiving voice and image data by radio communication via a base station, comprising the steps of selecting image data produced by the own portable telephone set or received from any other portable telephone set, storing the selected image data after conversion to a predetermined format, and displaying selected image data among the stored image data as waiting display or menu display The stored image data are partly or fully transferred to any other portable telephone set or a personal computer (PC) by radio communication.

Other objects and features will be clarified from the following description with reference to attached drawings.

PREFERRED EMBODIMENTS OF THE INVENTION

Preferred embodiments of the present invention will now be described with reference to the drawings.

Figure 1:
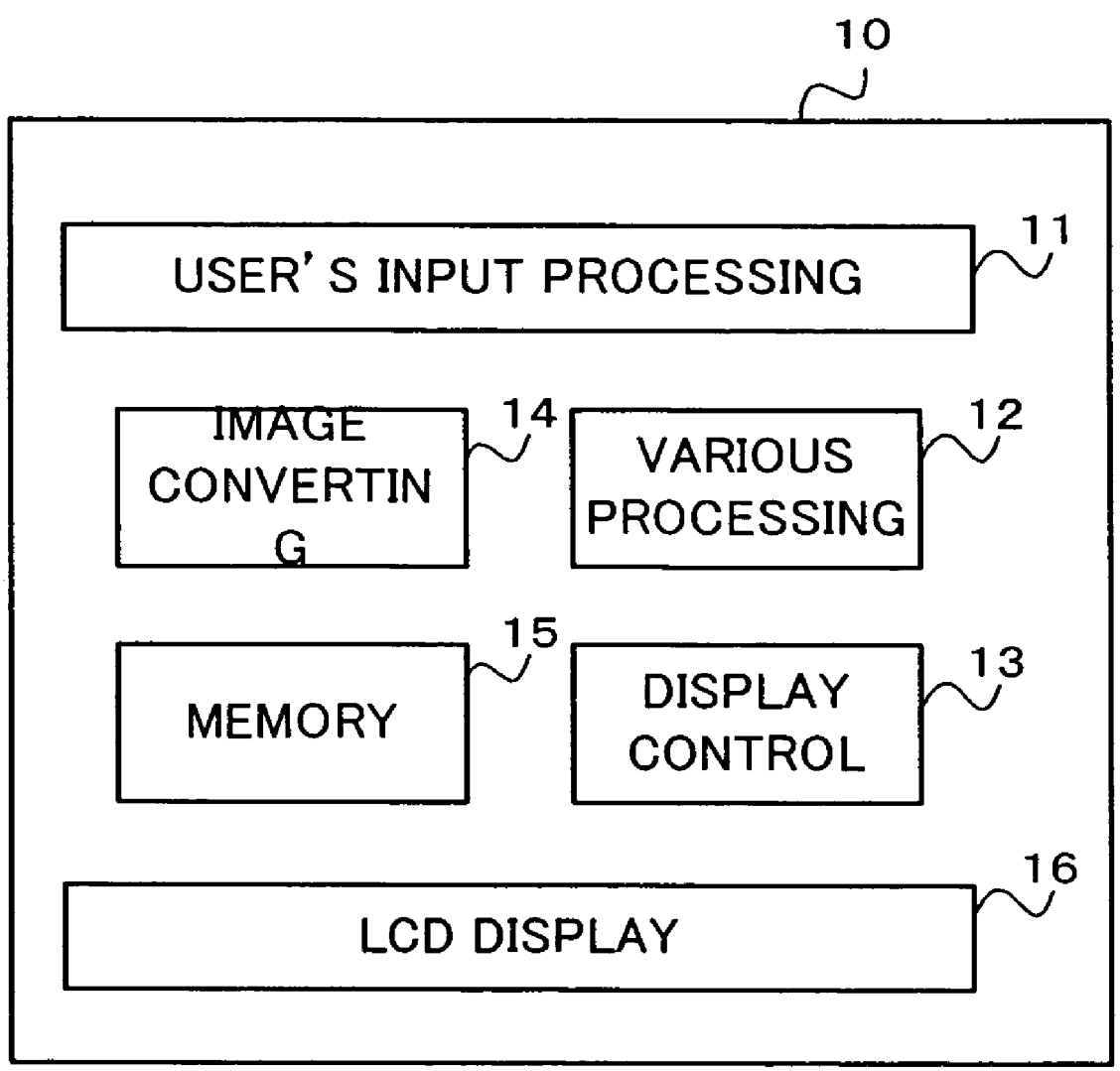
FIG. 1 is a block diagram showing an essential part of an embodiment of the portable telephone set according to the present invention.

FIG. 1 is a block diagram showing an essential part of an embodiment of the portable telephone set according to the present invention. The portable telephone set 10 as illustrated, comprises a user's input processing part 11, a various item processing part 12, a display control part 13, an image converter part 14, a memory unit 15 and a display part such as a LCD (liquid crystal display) (hereinafter referred to as LCD display part) 16. The portable telephone set 10 includes an antenna or the like for transmitting and receiving microwave radio signals to and from portable or fixed telephone sets via a base station (not shown).

The main functions of the constituent elements 11 to 16 of the portable telephone set shown in FIG. 1 will now be described. The user's input processing part 11 outputs execution commands to the individual constituent elements based on key inputs from the user who owns and operates the portable telephone set 10. The various item processing part 12 executes processes such as letter input and menu display based on the execution commands outputted from the user's input processing part 11.

The display control part 13 delivers the display data to the LCD display part 16 based on the display requests outputted from the various item processing part 12. When the copy request for copying display data to be displayed on the LCD display part 16 from the various item processing part 12, the display data is obtained from the LCD display part 16 and delivered to the image converter part 14. The image converter part 14 converts the data requested by the various item processing part 12 to an image format capable of being stored in the memory device 15.

The memory unit 15 is an IC (semiconductor integrated circuit) memory, for instance, and preserves (or stores) image data having been converted for a predetermined format in the image converter part 14. The image data are generated by imaging with a CCD camera (not shown) mounted in the own portable telephone set 10 or received from a different movable set (portable telephone set, for instance) or a PC via the base station.

Figure 2:
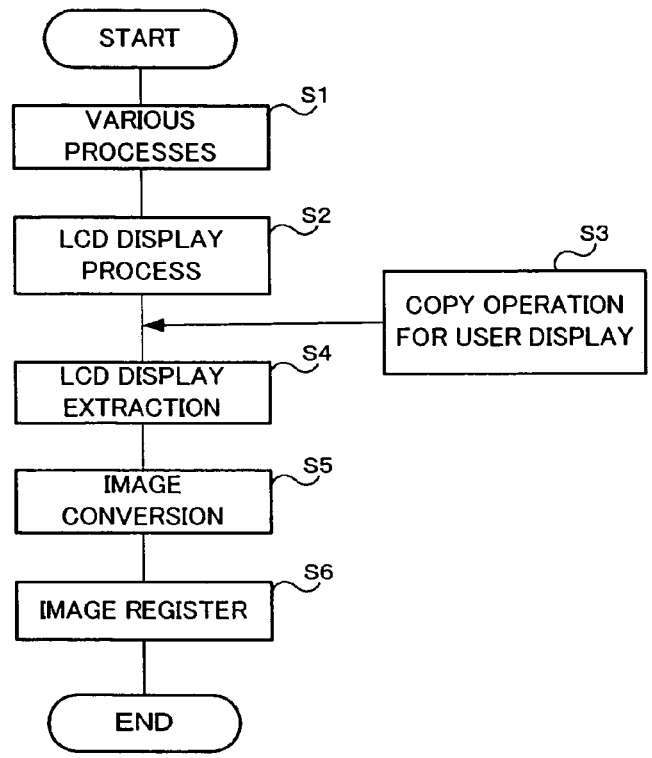
FIG. 2 is a flow chart showing the operation of the portable telephone set 10.
Figure 3:
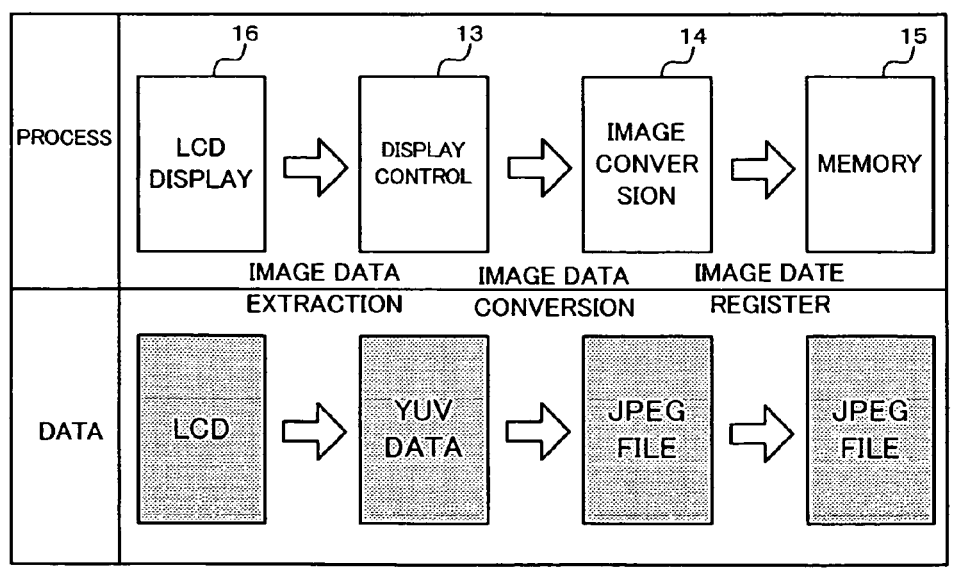
FIG. 3 is a view showing the flow of data in processes in the portable telephone set 10 shown in FIG. 10 after flow in FIG. 2.

The operation of the preferred embodiment of the portable telephone set 10 shown in FIG. 1 according to the present invention will now be described in details with reference to FIGS. 2 and 3. FIG. 2 is a flow chart showing the operation of the portable telephone set 10. FIG. 3 is a view showing the flow of data in processes in the portable telephone set 10 shown in FIG. 1 according to the flow in FIG. 2.

When the various item processing part 12 executes various processes (such as letter inputs, menu display and contents display), the user selects the copy operation with respect to the display on the LCD display 16 in FIG. 1 by menu and button operations in the user's input processing part 11 in the portable telephone set 10. Then, according to the flow chart in FIG. 2, the display data is extracted from the LCD display part 16 and converted to the image data which is stored in the memory unit 15.

First, various processes are executed in the various item processing part 12 (step S1). When the pertinent process is a process of display on the LCD display part 16, an LCD display process is executed (step S2). Then, when the user desires copying of the display area, a copy operation for the display on the LCD display part 16 is designated (step S3). Then, the display data is extracted from the LCD display part 16 (step S4). The extracted data is converted in the image converter part 14 to the image data of a predetermined format (step S5). Finally, the image data is stored, i.e., image registered, in the memory unit 15, thus bringing an end to the process.

Referring now to FIG. 3, display data (LCD in the Figure) on the LCD display part 16 is shown at the left end. On the right side of this data, display data (YUV) extracted by the display control part 13 from the LCD display part 16 is shown. On the further right side of this data, image data converted in the image converter part 14 for a predetermined format (for instance JPEG file) is shown. On the still further right side, registered image data memorized in the memory unit 15 (JPEG file) is shown. In FIG. 3, the data flow is shown by arrows in the order of the process sequence. The JPEG (joint photographic experts (group)) is an international standard system of still image compression standardized by a joint operation group of ISO and ITU-T.

In the preferred embodiment described above, the desired display data on the portable telephone set 10 is converted to image and stored as the image data in the memory unit 15. However, it is possible to obtain data development to other users by causing transfer of obtainable the image data to other movable units or personal computers (PC) by radio communication of the portable telephone set 10.

As has been described in the foregoing, according to the present invention the following pronounced practical effects are obtainable. That is, all the LCD displays in the portable telephone set (such as letter input displays and menu displays) can be converted to the image data and registered in the memory unit as desired by the user. The obtained image data can be selected as desired as preset items on the portable telephone set for use on the waiting area or the like. Furthermore, the data development to other users is possible by transferring the image data to other movable sets or PCs by radio communication.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A portable telephone set having a user's input processing part such as a keyboard and a display part such as a liquid crystal display unit and operable for radio communication via a base station, comprising:

a various item processing part for processing execution commands outputted from the user's input processing part, a display control part for delivering display data to be displayed on the display part on the basis of process requests outputted from the various item processing part, an image converter part for extracting display data displayed on the display part on the basis of a user's copying request and executing image conversion of the obtained display data into image data having a predetermined format, and a memory device for storing the image data in the predetermined format.

2. The portable telephone set according to claim 1, wherein image data stored in the memory unit is displayed as waiting display or the like on the display part.

3. The portable telephone set according to claim 2, wherein the image data is converted in the image converter part to a JPEG file and stored in the memory unit.

4. The portable telephone set according to claim 2, wherein the image data is obtained by imaging with a camera mounted on the portable telephone set.

5. The portable telephone set according to claim 2, wherein the image data is selected from images received by radio communication from the base station.

6. The portable telephone set according to claim 1, wherein the image data is converted in the image converter part to a JPEG file and stored in the memory unit.

7. The portable telephone set according to claim 6, wherein the image data is obtained by imaging with a camera mounted on the portable telephone set.

8. The portable telephone set according to claim 6, wherein the image data is selected from images received by radio communication from the base station.

9. The portable telephone set according to claim 1, wherein the image data is obtained by imaging with a camera mounted on the portable telephone set.

10. The portable telephone set according to claim 9, wherein the image data is selected from images received by radio communication from the base station.

11. The portable telephone set according to claim 1, wherein the image data is selected from images received by radio communication from the base station.

12. An image display method for a portable telephone set for displaying image data or the like on a display part of the portable telephone set for transmitting and receiving voice and image data by radio communication via a base station, comprising the steps of:

selecting image data displayed on a display part of a portable telephone set, extracting the selected image data from the display part, converting the selected image data to a predetermined format, storing the selected image data in the predetermined format following the converting step, and displaying the selected image data among the stored image data as any of waiting display, menu display, and wall paper display, wherein the selected image data may include any of letter input displays and menu displays.

13. The image display method for a portable telephone set according to claim 12, wherein the stored image data are partly or fully transferred to any other portable telephone set or a personal computer (PC) by radio communication.

* * * * *